US011295235B2

(12) United States Patent
Guim Bernat et al.

(10) Patent No.: US 11,295,235 B2
(45) Date of Patent: Apr. 5, 2022

(54) FILTERING TRAINING DATA FOR MODELS IN A DATA CENTER

(71) Applicant: Intel Corporation, Santa Clara, CA (US)

(72) Inventors: Francesc Guim Bernat, Barcelona (ES); Mark A. Schmisseur, Phoenix, AZ (US); Karthik Kumar, Chandler, AZ (US); Thomas Willhalm, Sandhausen (DE)

(73) Assignee: Intel Corporation, Santa Clara, CA (US)

( * ) Notice: Subject to any disclaimer, the term of this patent is extended or adjusted under 35 U.S.C. 154(b) by 1100 days.

(21) Appl. No.: 15/857,313

(22) Filed: Dec. 28, 2017

(65) Prior Publication Data
US 2019/0034829 A1 Jan. 31, 2019

(51) Int. Cl.
| G06N 20/00 | (2019.01) |
| G06N 5/04 | (2006.01) |
| G06F 3/06 | (2006.01) |
| H04L 12/26 | (2006.01) |
| H04L 12/24 | (2006.01) |
| H04L 43/028 | (2022.01) |
| H04L 41/16 | (2022.01) |
| H04L 41/14 | (2022.01) |
| H04L 41/5006 | (2022.01) |

(52) U.S. Cl.
CPC .......... *G06N 20/00* (2019.01); *G06F 3/0608* (2013.01); *G06F 3/0655* (2013.01); *G06F 3/0673* (2013.01); *G06N 5/047* (2013.01); *H04L 41/14* (2013.01); *H04L 41/16* (2013.01); *H04L 43/028* (2013.01); *H04L 41/5006* (2013.01)

(58) Field of Classification Search
CPC ...... G06F 3/0608; G06N 20/00; G06N 5/047; H04L 41/14; H04L 41/16; H04L 43/028
USPC ........... 706/12; 345/173, 178; 370/235, 329; 382/261
See application file for complete search history.

(56) References Cited

U.S. PATENT DOCUMENTS

| 8,474,027 B2 | 6/2013 | Meijer et al. |
| 9,710,829 B1 * | 7/2017 | Sitapara ............. G06Q 30/0276 |
| 2004/0190528 A1 | 9/2004 | DaCosta |

(Continued)

FOREIGN PATENT DOCUMENTS

KR 101179915 B1 * 9/2012 ............. G10L 15/14

OTHER PUBLICATIONS

Hegde et al.; "Parallel and Distributed Deep Learning;" Stanford University; (Jun. 28, 2016); 8 pages.

*Primary Examiner* — Prabodh M Dharia
(74) *Attorney, Agent, or Firm* — Compass IP Law PC

(57) ABSTRACT

Technology for a data filter device operable to filter training data is described. The data filter device can receive training data from a data provider. The training data can be provided with corresponding metadata that indicates a model stored in a data store that is associated with the training data. The data filter device can identify a filter that is associated with the model stored in the data store. The data filter device can apply the filter to the training data received from the data provider to obtain filtered training data. The data filter device can provide the filtered training data to the model stored in the data store, wherein the filtered training data is used to train the model.

19 Claims, 6 Drawing Sheets

(56) References Cited

U.S. PATENT DOCUMENTS

| | | | |
|---|---|---|---|
| 2005/0128951 A1* | 6/2005 | Chawla | H04L 47/50 |
| | | | 370/235 |
| 2005/0135700 A1* | 6/2005 | Anderson | G06T 5/002 |
| | | | 382/261 |
| 2010/0161909 A1 | 6/2010 | Nation et al. | |
| 2012/0102004 A1 | 4/2012 | Johnson et al. | |
| 2014/0201435 A1 | 7/2014 | Dong et al. | |
| 2014/0268245 A1* | 9/2014 | Kawach | H04N 1/00244 |
| | | | 358/403 |
| 2015/0012468 A1* | 1/2015 | Kegel | H04N 21/4668 |
| | | | 706/12 |
| 2015/0286533 A1* | 10/2015 | Kaufthal | G06F 16/1787 |
| | | | 707/639 |
| 2016/0105821 A1* | 4/2016 | Senarath | H04W 76/00 |
| | | | 370/329 |
| 2016/0292351 A1* | 10/2016 | Jacques | G06F 30/15 |
| 2017/0364733 A1* | 12/2017 | Estrada | G06N 3/0454 |
| 2018/0121247 A1 | 5/2018 | Kaul | |
| 2018/0255329 A1* | 9/2018 | Gonzalez-Banos | |
| | | | H04N 21/8456 |
| 2018/0288182 A1* | 10/2018 | Tong | B60R 1/00 |
| 2019/0034763 A1 | 1/2019 | Bernat et al. | |
| 2019/0079921 A1* | 3/2019 | Terry | G06N 5/041 |
| 2020/0015036 A1* | 1/2020 | Graham | H04W 4/021 |
| 2021/0157312 A1* | 5/2021 | Cella | G06K 9/6263 |

\* cited by examiner

FILTERING TRAINING DATA FOR MODELS IN A DATA CENTER

BACKGROUND

Artificial intelligence (AI) can involve discovering patterns in input data, constructing AI models using discovered patterns in the input data, and using the AI models to make predictions on subsequently received data. In one example, building the AI model can involve collecting input data for generation of the AI model. The input data can be received from a data provider. The input data can be used as training data to train the AI model. For example, the AI model can be trained using the training data to recognize patterns in input data and make inferences with respect to the input data.

In one example, building and training AI models can involve processing a relatively large input data set, which can consume a relatively large amount of computing resources. Therefore, AI is generally performed using dedicated graphics processing unit (GPU) and field-programmable gate array (FPGA) hardware in a cloud environment.

BRIEF DESCRIPTION OF THE DRAWINGS

Features and advantages of invention embodiments will be apparent from the detailed description which follows, taken in conjunction with the accompanying drawings, which together illustrate, by way of example, invention features; and, wherein.

Figure 1:
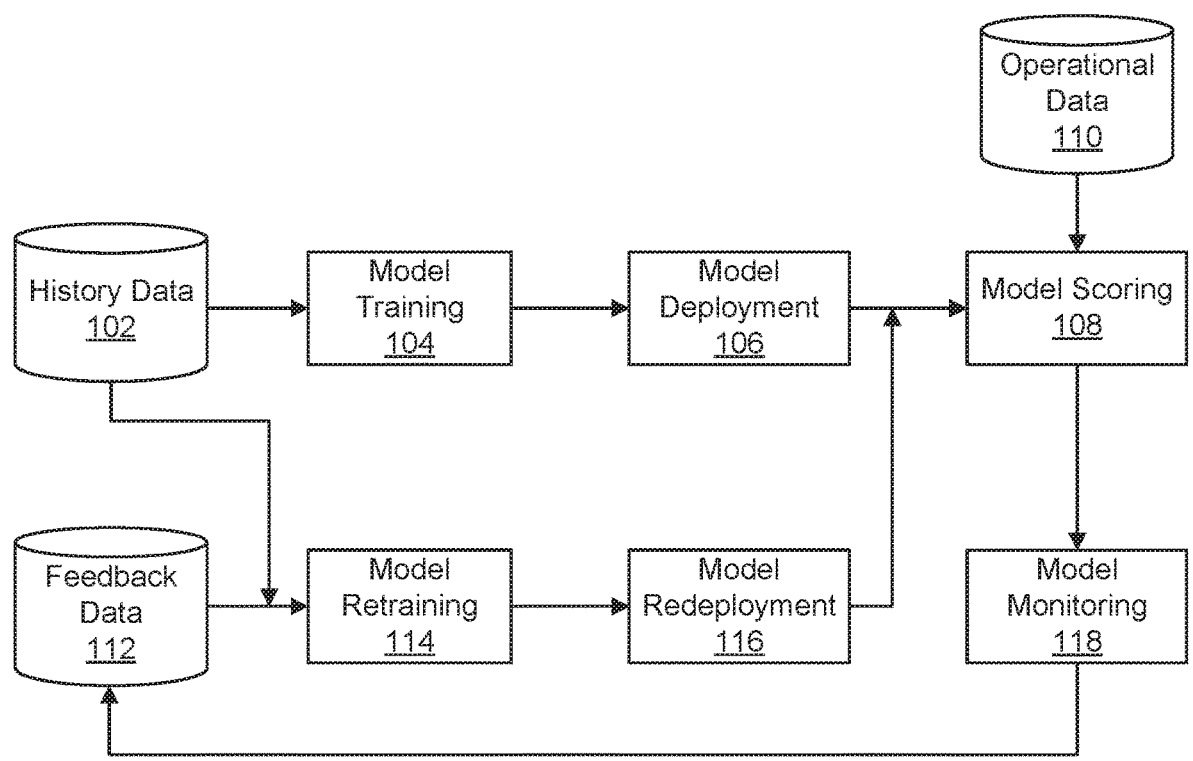
FIG. 1 illustrates a machine learning workflow in accordance with an example embodiment.

Reference will now be made to the exemplary embodiments illustrated, and specific language will be used herein to describe the same. It will nevertheless be understood that no limitation on invention scope is thereby intended.

DESCRIPTION OF EMBODIMENTS

Before the disclosed invention embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various invention embodiments. One skilled in the relevant art will recognize, however, that such detailed embodiments do not limit the overall inventive concepts articulated herein, but are merely representative thereof.

As used in this specification and the appended claims, the singular forms "a," "an" and "the" include plural referents unless the context clearly dictates otherwise. Thus, for example, reference to "a bit line" includes a plurality of such bit lines.

Reference throughout this specification to "an example" means that a particular feature, structure, or characteristic described in connection with the example is included in at least one embodiment of the present invention. Thus, appearances of the phrases "in an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

An initial overview of technology embodiments is provided below and then specific technology embodiments are described in further detail later. This initial summary is intended to aid readers in understanding the technology more quickly, but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

In recent years, increased performance and capabilities of hardware platforms have enabled advances in artificial intelligence (AI). This recent advancement in AI can be due to high-density compute platforms, which can be better equipped to process increased data set sizes. In other words, these high-density compute platforms can achieve increased performance levels on AI workloads. For example, as training AI models (or deep learning networks) involves moving a large amount of data, current hardware platforms used for AI can include high-capacity, high-speed high bandwidth memory technologies, which can provide a high level of on-chip storage and an increased memory access speed. Current hardware platforms used for AI can offer separate pipelines for computation and data management. In addition, current hardware platforms used for AI can include bi-directional high-bandwidth links, which can enable application-specific integrated circuits (ASICs) to interconnect so data can move between them, which can result in additional compute resources being assigned to a task or model size expansion without a decrease in speed.

One challenge with real-time ecosystems connected to AI appliances in a data center is the vast amount of data being generated by data providers (e.g., Internet of Things (IoT) devices) to be stored and processed in storage and memory devices of the AI appliances in the data center. The data being provided by the data providers can be used as training data to train an AI model that runs in an AI appliance in the data center. However, this vast amount of data can cause strain to the storage and memory units of the AI appliances that are processing the data.

In the present technology, memory and storage devices used in AI appliances in the data center can utilize a technique for intelligently filtering data received from the data providers before the data is stored as training data at the data center, which can reduce the amount of irrelevant data being stored (or later discarded after being stored). In other words, intelligently filtering data before it is stored can advantageously lower the processing and storage overheads needed to manage this vast amount of data that is received and processed at the AI appliances in the data center. In the present technology, storage architectures or storage and memory endpoints (e.g., local storage, disaggregated storage, pooled storage, etc.), can include data filters in different data hierarchies, which can be used to identify data to be stored versus data to be discarded. In other words, the data filters can use certain algorithms to identify relevant data to be stored versus irrelevant data to be discarded, which can ease the burden on the AI appliances in the data center.

The present technology provides an interface switch/gateway that can receive data from a service provider, such as an IoT device, a vehicle, or the like. This data can be collected at the service provider, and can be used as training data for an AI model that is executed in the data center. The data can also include metadata that describes the data. For example, the metadata can include a model ID. In other words, the metadata can indicate that the data is to be used to train an AI model with a certain model ID. The model ID can, in some cases, be a universally unique identifier (UUID), and the model ID can be previously agreed upon by IoT devices and the data center or owner models. The interface switch/gateway can include filtering logic that filters the received data accordingly. For example, the filtering logic in the interface switch/gateway can filter the incoming data to retain certain types of data for a given model ID. Some of these filtering rules can be provided from the AI training models themselves (e.g., the AI training models can regulate what data gets ingested into their AI training model). The filtered data can be discarded and data that passes through the filter can be provided to storage and memory endpoint(s) in the data center, and this data can be used as the training data to train the AI model. In addition, the filtering logic can reside in other hierarchical layers in the data center to, for example, further filter the data before obtaining a data set that is to be used as the training data to train the AI model.

In traditional approaches, data filtering can be performed by the data provider (e.g., the IoT device), as opposed to being filtered at the data center. For example, an IoT device can capture various types of data, and then determine to only send one type or set of data to the AI appliance in the data center. However, this traditional approach of performing the data filtering at the data provider results in several disadvantages in terms of how the data is used to train AI models at the data center. In one example of a traditional approach, the decision as to the types of data to be filtered is made by the data provider, even though suitable data types for a given AI model may change over time (which is sometimes unknown to the data provider filtering the data). With this traditional approach, there tends to be a large variability amongst data providers in terms of different schemes utilized for filtering data, so the data center would receive different data types depending on the data provider.

One advantage of filtering the data at the data center is that the data can be used for particular models, but not used for other models. The data center can initially receive unfiltered data from the data provider. After the unfiltered data is received at the data center, different filters (e.g., Y and Z) can be applied to the data, and the different filters can correspond with different AI models. For example, based on the different filters (e.g., Y and Z), the unfiltered data can be discarded for a first AI model but applied to a second AI model. An additional advantage of filtering the data at the data center is for real-time retraining at the data center, which can involve filtering to obtain a reduced portion of a certain data stream or an increased emphasis on certain data streams. This type of filtering cannot be performed by the data provider, as the filtering is done in real-time during a retraining process that is performed at the data center.

Therefore, there are various advantages of filtering received data at the data center, as opposed to the data provider filtering data before sending the data to the AI appliance in the data center. In one example, the filtering can be performed based on an amount of data that a given training model can consume (e.g., based on a compute limitation of the training model). In addition, the filters can allow endpoint storage and memory devices used in AI appliances to optimize the storage of training data to be consumed by different training models running on the AI appliances.

In one example, the storage and memory devices can include volatile memory, nonvolatile memory (NVM), or a combination thereof. Volatile memory can include any type of volatile memory, which is not considered to be limiting. Volatile memory is a storage medium that requires power to maintain the state of data stored by the medium. Non-limiting examples of volatile memory can include random access memory (RAM), such as static random-access memory (SRAM), dynamic random-access memory (DRAM), synchronous dynamic random-access memory (SDRAM), and the like, including combinations thereof. SDRAM memory can include any variant thereof, such as single data rate SDRAM (SDR DRAM), double data rate (DDR) SDRAM, including DDR, DDR2, DDR3, DDR4, DDR5, and so on, described collectively as DDRx, and low power DDR (LPDDR) SDRAM, including LPDDR, LPDDR2, LPDDR3, LPDDR4, and so on, described collectively as LPDDRx. In some examples, DRAM complies with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209B for LPDDR SDRAM, JESD209-2F for LPDDR2 SDRAM, JESD209-3C for LPDDR3 SDRAM, and JESD209-4A for LPDDR4 SDRAM (these standards are available at www.jedec.org; DDR5 SDRAM is forthcoming). Such standards (and similar standards) may be referred to as DDR-based or LPDDR-based standards, and communication interfaces that implement such standards may be referred to as DDR-based or LPDDR-based interfaces. In one specific example, the system memory can be DRAM. In another specific example, the system memory can be DDRx SDRAM. In yet another specific aspect, the system memory can be LPDDRx SDRAM.

NVM is a storage medium that does not require power to maintain the state of data stored by the medium. NVM has traditionally been used for the task of data storage, or long-term persistent storage, but new and evolving memory technologies allow the use of NVM in roles that extend beyond traditional data storage. One example of such a role is the use of NVM as main or system memory. Non-volatile system memory (NVMsys) can combine data reliability of traditional storage with ultra-low latency and high bandwidth performance, having many advantages over traditional volatile memory, such as high density, large capacity, lower power consumption, and reduced manufacturing complexity, to name a few. Byte-addressable, write-in-place NVM such as three-dimensional (3D) cross-point memory, for example, can operate as byte-addressable memory similar to dynamic random-access memory (DRAM), or as block-addressable memory similar to NAND flash. In other words, such NVM can operate as system memory or as persistent storage memory (NVMstor). In some situations where NVM is functioning as system memory, stored data can be discarded or otherwise rendered unreadable when power to the NVMsys is interrupted. NVMsys also allows increased flexibility in data management by providing non-volatile, low-latency memory that can be located closer to a processor in a computing device. In some examples, NVMsys can reside on a DRAM bus, such that the NVMsys can provide ultra-fast DRAM-like access to data. NVMsys can also be useful in computing environments that frequently access large, complex data sets, and environments that are sensitive to downtime caused by power failures or system crashes.

Non-limiting examples of NVM can include planar or three-dimensional (3D) NAND flash memory, including single or multi-threshold-level NAND flash memory, NOR flash memory, single or multi-level Phase Change Memory (PCM), such as chalcogenide glass PCM, planar or 3D PCM, cross-point array memory, including 3D cross-point memory, non-volatile dual in-line memory module (NVDIMM)-based memory, such as flash-based (NVDIMM-F) memory, flash/DRAM-based (NVDIMM-N) memory, persistent memory-based (NVDIMM-P) memory, 3D cross-point-based NVDIMM memory, resistive RAM (ReRAM), including metal-oxide- or oxygen vacancy-based ReRAM, such as $HfO_2-$, $Hf/HfO_x-$, $Ti/HfO_2-$, $TiO_x-$, and $TaO_x$-based ReRAM, filament-based ReRAM, such as $Ag/GeS_2-$, $ZrTe/Al_2O_3-$, and Ag-based ReRAM, programmable metallization cell (PMC) memory, such as conductive-bridging RAM (CBRAM), silicon-oxide-nitride-oxide-silicon (SONOS) memory, ferroelectric RAM (FeRAM), ferroelectric transistor RAM (Fe-TRAM), anti-ferroelectric memory, polymer memory (e.g., ferroelectric polymer memory), magnetoresistive RAM (MRAM), write-in-place non-volatile MRAM (NVMRAM), spin-transfer torque (STT) memory, spin-orbit torque (SOT) memory, nanowire memory, electrically erasable programmable read-only memory (EEPROM), nanotube RAM (NRAM), other memristor- and thyristor-based memory, spintronic magnetic junction-based memory, magnetic tunneling junction (MTJ)-based memory, domain wall (DW)-based memory, and the like, including combinations thereof. The term "memory device" can refer to the die itself and/or to a packaged memory product. NVM can be byte or block addressable. In some examples, NVM can comply with one or more standards promulgated by the Joint Electron Device Engineering Council (JEDEC), such as JESD21-C, JESD218, JESD219, JESD220-1, JESD223B, JESD223-1, or other suitable standard (the JEDEC standards cited herein are available at www.jedec.org). In one specific example, the NVM can be 3D cross-point memory. In another specific example, the memory can be NAND or 3D NAND memory. In another specific example, the system memory can be STT memory.

FIG. 1 illustrates an example of a machine learning workflow that can be implemented at a data center. In the machine learning workflow, history data 102 can be used for model training 104. After a model (e.g., an AI model) is trained, model deployment 106 can occur, in which the model is deployed and receives real-world data. Model scoring 108 can be used to assess the accuracy and efficacy of the model. The model scoring 108 can be achieved based on operational data 110. Based on the model scoring 108, model monitoring 118 can be performed over time to obtain feedback data 112, which can be used for model retraining 114. The model can be retrained based on the feedback data 112 and the history data 102. After the model is retrained, model redeployment 116 can occur, in which the model is redeployed and again receives real-world data. At this point, the model can again be scored and monitored, and the model can be retrained any number of times depending on the accuracy and efficacy of the model.

Figure 2:
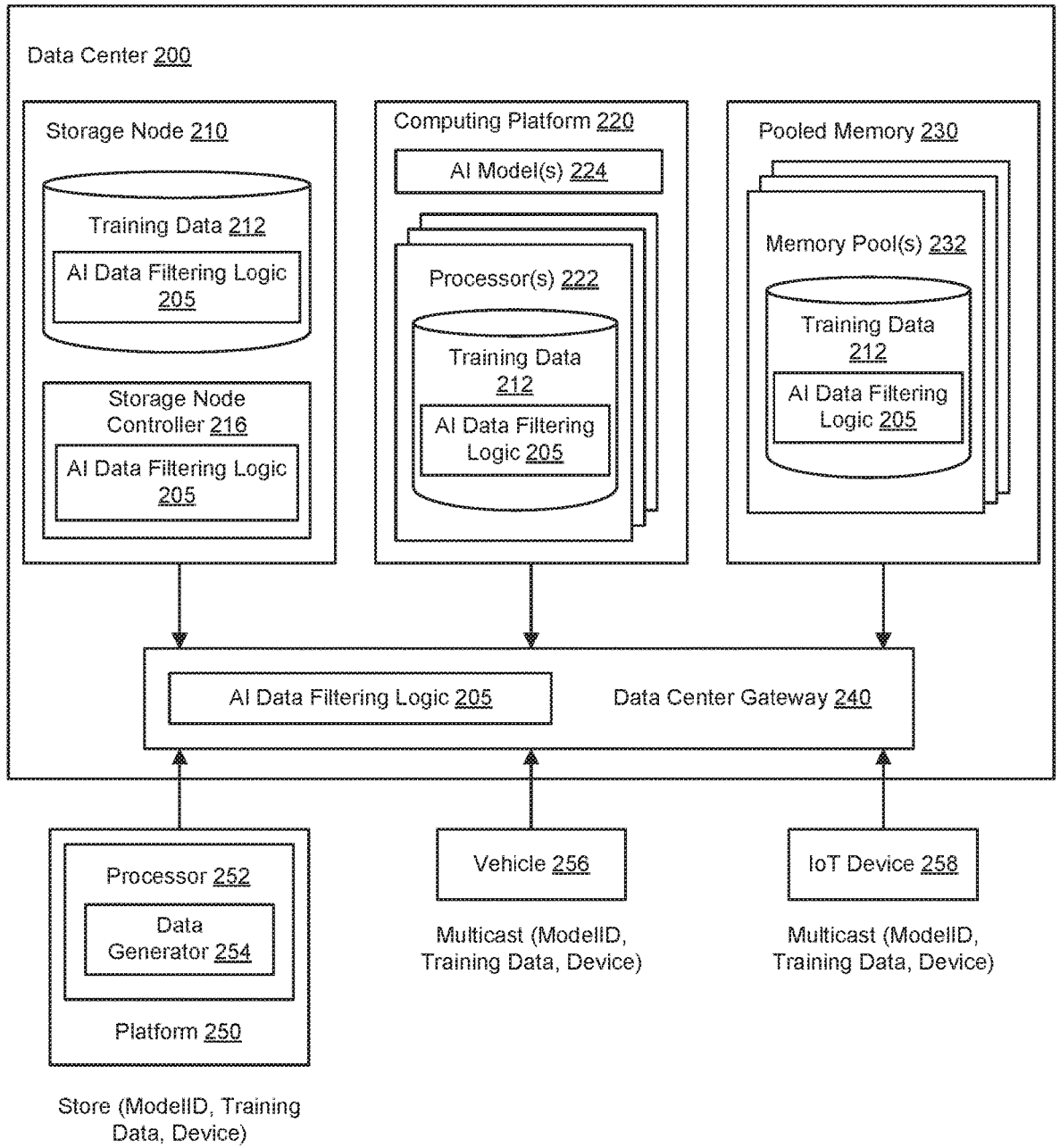
FIG. 2 illustrates a system and related operations for filtering training data in accordance with an example embodiment.

FIG. 2 illustrates an exemplary system and related operations for filtering training data 212 received from a data provider. The data provider can include, but is not limited to, a processor 252 on a platform 250, a vehicle 256 or an IoT device 258. The training data 212 can be filtered using AI data filtering logic 205 (or data filter devices). The AI data filtering logic can be included in a controller, processor, or the like. The filtered training data 212 can be stored in various data store(s) in a data center 200. For example, the filtered training data 212 can be stored in a storage node 210, a computing platform 220 and/or a pooled memory 230 in the data center 200. In addition, the AI data filtering logic 205 can be placed in various storage architecture hierarchies of the data center 200, such as a data center gateway 240 (or switch), a storage node controller 216, the storage node 210, the computing platform 220 and/or the pooled memory 230 in the data center 200.

In one example, the filtered training data 212 can be used to train an AI model 224 in the data center 200. For example, the filtered training data 212 and the AI model 224 can be stored in the storage node 210, the computing platform 220 and/or the pooled memory 230 in the data center 200. After the AI model 224 is trained using the filtered training data 212, the AI model 224 can be used to recognize patterns in input data and make inferences with respect to the input data In one configuration, the AI data filtering logic 205 (or data filter device) can receive training data 212 from the data provider (e.g., the processor 252 on the platform 250, the vehicle 256 or the IoT device 258). For example, the AI data filtering logic 205 can receive the training data 212 from a data generator 254 that runs on the processor 252 in the platform 250. The training data 212 may be sent as a unicast transmission or as a multicast transmission from the data provider.

In one example, the training data 212 can be received with corresponding metadata. The metadata can include an indication that the corresponding data is to be used for training AI model(s) 224 (and not some other type of data). The metadata can include an indication of a type of device that sent the training data 212 (e.g., a vehicle or an IoT device). The metadata can include an indication of a data type associated with the training data 212 (e.g., vehicle sensor information). In addition, the metadata can indicate an AI model 224 stored in a data store (e.g., in the storage node 210, the computing platform 220 and/or the pooled memory 230) that is associated with the training data 212. In other words, the training data 212 can include metadata that associates the training data 212 with a specific AI model 224. For example, the metadata can indicate that the training data 212 is to be used to train AI model Z.

In one configuration, the AI data filtering logic 205 (or data filter device) can identify one or more filters for filtering the received training data 212. The AI data filtering logic 205 can select the filter(s) from a predefined set of filters, and each filter can include a set of filtering rules. The filtering rules can define which training data 212 is to be discarded versus which training data 212 is to be kept and stored at an endpoint memory or storage device in the data center 200. The filter(s) can be applicable to different data streams that are received from different service providers, in which the different data streams can be directed for different AI models 224. For example, the AI data filtering logic 205 can select filter(s) that are associated with a given AI model 224 (or given AI model ID or AI model instance ID). In other words, the AI data filtering logic 205 can identify the specific AI model 224 associated with the training data 212 based on the metadata corresponding to the training data 212, and based on the specific AI model 224 that is identified, the AI data filtering logic 205 can determine appropriate filter(s) for that AI model 224.

As a non-limiting example, the AI data filtering logic 205 can receive training data 212 related to traffic information from the processor 252 running on the platform 250. The training data 212 can include metadata indicating its applicability to traffic information. The AI data filtering logic 205 can identify three AI models that are stored in the data center 200, such as a traffic AI model, an advertisement AI model and a fraud detection AI model. Based on the metadata indicating that the training data 212 is related to traffic information, the AI data filtering logic 205 can include filter(s) associated with the traffic AI model. In other words, the AI data filtering logic 205 can apply the filter(s) associated with the traffic AI model to the training data 212 related to traffic information.

In one example, the AI data filtering logic 205 can manage the predefined set of filters for the AI models 224. Different AI models 224 can be associated with different filter(s), so the AI data filtering logic 205 can identify the appropriate filter(s) from the predefined set of filters that corresponds to the specific AI model 224 associated with the training data 212 received from the data provider. Therefore, the AI data filtering logic 205 can identify the appropriate filter(s) from a predefined set of filters that are available to be applied to different AI models 224.

In one example, the AI data filtering logic 205 can include the filter(s), and the set of filtering rules for each filter. The filtering rules can be in the form of a bit stream or programmable logic. The bit stream can be configuration data that is loaded into the AI data filtering logic 205. The AI data filtering logic 205 can be included in one of: a field-programmable gate array (FPGA), a configurable application-specific integrated circuit (ASIC) or a node controller.

In another example, the AI data filtering logic 205 can select appropriate filter(s) depending on a type of service provider or tenant that sends the training data 212. For example, specific filter(s) can be applicable to specific service providers or tenants, while other filter(s) may not be applicable to specific service providers or tenants. Therefore, irrespective of the AI model 224 associated with the received training data 212, the AI data filtering logic 205 can initially filter the received training data 212 based on the service provider or tenant.

As another non-limiting example, the AI data filtering logic 205 can receive training data 212 related to vehicle sensor data. The received training data 212 can be associated with a particular vehicle AI model. For example, the AI data filtering logic 205 may have already filtered out received training data 212 that was associated with other AI model types. The AI data filtering logic 205 can apply a set of filtering rule(s) that are specific to the vehicle AI model when filtering the received training data 212. As a non-limiting example, based on the filtering rule(s), the AI data filtering logic 205 can determine to filter vehicle speed information, and not filter vehicle position information. As another non-limiting example, based on the filtering rule(s), the AI data filtering logic 205 can determine to filter vehicle speed information when the vehicle is traveling less than 50 miles per hour, and not filter vehicle speed information when the vehicle is traveling more than 50 miles per hour. As yet another non-limiting example, based on the filtering rule(s), the AI data filtering logic 205 can determine to filter vehicle speed information associated with vehicles of a first manufacturer, and not filter vehicle speed information associated with vehicles of a second manufacturer. Therefore, a specific AI model 224 (e.g., the vehicle AI model) can be associated with a set of filtering rule(s).

As another non-limiting example, the AI data filtering logic 205 can receive training data 212 related to vehicle information. The vehicle information can include four fields—car type, type of engine (e.g., diesel or gasoline), current speed and temperature. The received training data 212 can be associated with a particular vehicle AI model. The AI data filtering logic 205 can apply a set of filtering rule(s) that are specific to the vehicle AI model when filtering the received training data 212. For example, based on the filtering rule(s) that are specific to the vehicle AI, the AI data filtering logic 205 can filter out the car type and temperature fields in the vehicle information, and provide vehicle information with the remaining fields (e.g., type of engine and current speed) for storage at an endpoint storage and memory device in the data center 200.

In one configuration, the AI data filtering logic 205 can apply the selected filter(s) (that each correspond to the set of filtering rules) to the received training data 212 to obtain filtered training data 212. The filtered training data 212 can be training data 212 that is passed through the AI data filtering logic 205 (i.e., training data 212 that is not filtered out). On the other hand, training data 212 that is blocked by the filter(s) can be discarded and is not stored at an endpoint storage and memory device. In contrast, the filtered training data 212 can be stored at an endpoint storage and memory device, such as a storage device at the storage node 210, the computing platform 220 and/or the pooled memory 230. The filtered training data 212 can be used to train the AI model 224 stored in the storage node 210, the computing platform 220 and/or the pooled memory 230.

In one example, AI data filtering logic 205 can be included in the data center gateway 240. The AI data filtering logic 205 in the data center gateway 240 can receive training data 212 from a data provider. The AI data filtering logic 205 in the data center gateway 240 can filter the received training data 212 based on a set of filters, and the filtered training data 212 can be provided from the data center gateway 240 to second AI data filtering logic 205, for example, in the storage node 210, the computing platform 220 or the pooled memory 230. The second AI data filtering logic 205 can filter the received filtered training data 212 to obtain further filtered training data 212. In this case, the second AI data filtering logic 205 can receive the training data 212 not directly from the data provider, but rather indirectly from the data provider. The further filtered training data 212 can then be stored in the storage node 210, the computing platform 220 or the pooled memory 230. Therefore, in one example, multiple AI data filtering logic(s) 205 can be applied at different entities in the data center 200 to filter training data 212 multiple times before storing final training data 212 at a storage and memory endpoint in the data center 200. The multiple AI data filtering logic(s) 205 at the different entities in the data center 200 can implement a hierarchical filtering scheme to filter the training data 212 received from the data provider.

As a non-limiting example, AI data filtering logic 205 in the data center gateway 240 can receive training data 212 related to vehicle information from various vehicles types (e.g., sedans, trucks, hybrid vehicles, convertibles). The AI data filtering logic 205 in the data center gateway 240 can apply a filter to filter out (or discard) vehicle information from vehicles that are traveling less than 100 kilometers per hour. Based on the filtering applied by the AI data filtering logic 205 in the data center gateway 240, vehicle information from vehicles that are traveling greater than 100 kilometers per hour can be provided to the storage node 210, the computing platform 220 and pooled memory 230. Each of the storage node 210, the computing platform 220 and pooled memory 230 can have separate AI data filtering logic 205 to further filter the vehicle information received from the data center gateway 240. For example, the AI data filtering logic 205 in the storage node 210 can apply filtering to only store the vehicle information of sedans that are traveling greater than 100 kilometers per hour, the AI data filtering logic 205 in the computing platform 220 can apply filtering to only store the vehicle information of trucks that are traveling greater than 100 kilometers per hour, and the AI data filtering logic 205 in the pooled memory 230 can apply filtering to only store the vehicle information of hybrid vehicles and convertibles that are traveling greater than 100 kilometers per hour.

In one configuration, the AI data filtering logic 205 can apply filtering to the training data 212 to obtain filtered training data 212 in accordance with a quality of service (QoS) parameter that defines a minimum and maximum desired service level agreement (SLA) for a bandwidth allocated to the AI model 224 corresponding to the training data 212. In other words, the AI data filtering logic 205 can filter incoming training data 212 that is associated with the AI model 224 in a manner that satisfies a QoS constraint or a minimum and maximum desired SLA for a bandwidth allocated to the AI model 224.

As a non-limiting example, in which the AI data filtering logic 205 in the data center gateway 240 (or switch) applies filtering based on QoS, vehicle(s) 256 can be sending training data 212 about vehicle temperature, safety and tire quality. The training data 212 can be used to train one of three AI models 224 that are stored in the data center 200. In one example, the data center gateway 240 can use 100% of the bandwidth, and the data center gateway 240 can use a peak bandwidth of an input channel from the vehicle(s) 256. As an example, the data center gateway 240 can ingest 100-gigabits-per-second (100G). Out of this 100G, the data center gateway 240 can assign 50G to a first AI model, 30G to a second AI model and 20G to a third AI model. In this example, the AI data filtering logic 205 in the data center gateway 240 can apply filtering based on QoS, in which a particular amount of bandwidth can be allocated for a certain AI model 224 that runs in the data center 200.

In one configuration, the AI data filtering logic 205 can configure or register a new filter using a system software stack. For example, the AI data filtering logic 205 can receive input parameters from an AI model 224. The input parameters can define which type of information is useful or not useful for training the AI model 224. In other words, the AI model 224 can use the input parameters to define desired data types to be received at the AI model 224 for training of the AI model 224. The AI data filtering logic 205 can register the filter that is associated with the AI model 224 to include the input parameters received from the AI model 224. Each filter can have different input parameters, depending on the requirements of the AI model 224 that uses the filter to receive filtered training data 212. The AI data filtering logic 205 can store the filter that is associated with the AI model 224. As a result, the AI data filtering logic 205 can configure filter(s) for a specific AI model 224 based on input parameters received from the AI model 224.

In addition, the AI model 224 can provide the AI data filtering logic 205 with updated input parameters depending on new data criteria or an updated objective for the AI model 224. The AI data filtering logic 205 can configure updated or modified filter(s) for the AI model 224 to incorporate the updated input parameters. The AI models 224 can dynamically change their associated filter(s) depending on the training data needs of the AI models 224. As a result, the AI data filtering logic 205 can incorporate real-time feedback (in terms of updated input parameters) from the AI models 224 when configuring the filter(s) for the AI models 224.

Figure 3:
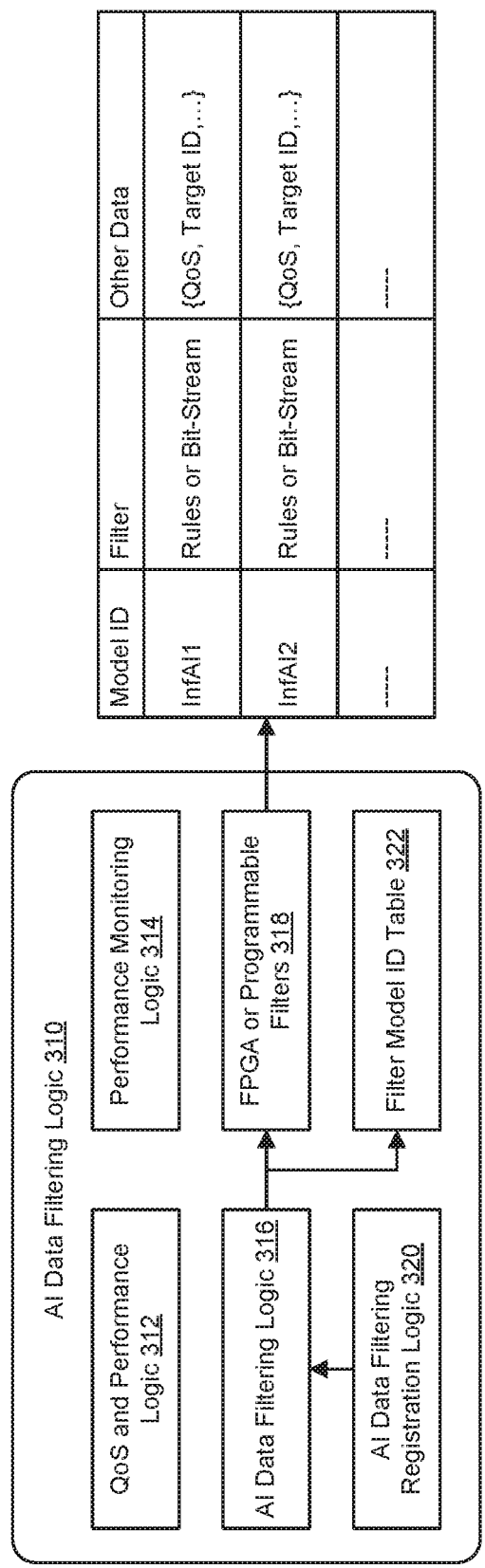
FIG. 3 illustrates data filtering logic in accordance with an example embodiment.

FIG. 3 illustrates an example of AI data filtering logic 310 (or a data filter device). The AI data filtering logic 310 can be placed in various storage architecture hierarchies of a data center, such as a network device (e.g., a switch or gateway), a storage node controller, a storage node, a computing platform and/or pooled memory in the data center. The AI data filtering logic 310 can include filter(s) to be applied to incoming training data. The AI data filtering logic 310 can filter the incoming training data using selected filter(s) and output filtered training data, which can be stored at a storage and memory endpoint in the data center and used to train an AI model in the data center. In one example, each filter that is maintained at the AI data filtering logic 310 can be associated with a set of filtering rules. The filtering rules can be in the form of a bit stream or programmable logic. The bit stream can be configuration data that is loaded into the AI data filtering logic 310. The AI data filtering logic 310 can be included in one of: a field-programmable gate array (FPGA), a configurable application-specific integrated circuit (ASIC) or a node controller.

In one configuration, the AI data filtering logic 310 can include QoS and performance logic 312, performance monitoring logic 314, AI data filtering logic 316, FPGA or programmable filters 318, AI data filtering registration logic 320 and a filter model ID table 322.

In one example, the QoS and performance logic 312 can be used to determine an amount of training data to be filtered for a particular model ID (e.g., each model ID can be assigned a particular amount of an overall bandwidth). The QoS and performance logic 312 can define QoS parameters that specify a minimum and maximum desired SLA in terms of bandwidth for a particular model ID. In one example, the QoS can involve limiting an amount of bandwidth for data that is sent to a particular model ID, or the QoS can provide additional priority to certain types of models or model IDs. The QoS and performance logic 312 can function to balance performance across different model IDs with penalizing performance. In one example, the performance monitoring logic 314 can work in conjunction with the QoS and performance logic 312 to monitor the performance of filtering across different model IDs with respect to the QoS parameters and/or the minimum and maximum SLA in terms of bandwidth for a particular model ID. In addition, the performance monitoring logic 314 can include performance counters that are provided by memory and storage endpoints to determine an amount of data or a type of data to be filtered for a given model ID.

In one example, the AI data filtering logic 316 can include the predefined filter(s). In other words, the AI data filtering logic 316 can include all predefined filter(s) that can be applied to different AI models. The AI data filtering logic 316 can apply the filter(s) to filter an incoming stream of data from a data provider, such that the AI data filtering logic 316 can determine which data is to be filtered and which data is to not be filtered and provided to another storage architecture hierarchy in the data center. In one example, the AI data filtering logic 316 can include FPGA or programmable filters 318. In other words, a given filter can consist of an ID that identifies one of the predefined filters included in the AI data filtering logic 316, or the filter can be a bit stream (or configuration data) that is registered in FPGA or programmable logic.

In one example, the AI data filtering logic 316 can include a filter model ID table 322. The filter model ID table 322 can include different registered filters that correspond to each of the different model IDs. For example, for a given model ID, a filtering rule or a filter based on a bit stream can be applicable. In addition, the filter model ID table 322 can include other data for a given model ID, such as a QoS parameter, a target ID (e.g., a storage ID or memory target ID), etc.

In one example, the AI data filtering registration logic 320 can be used to register the different AI training models being executed in the data center. In other words, the AI data filtering registration logic 320 can register how data associated to different AI models (which can be a generic model ID type or instance) is to be filtered. The AI data filtering registration logic 320 can receive input parameters from the AI models, where the input parameters are for the filters associated with the AI models. The AI data filtering registration logic 320 can register different input parameters for each filter associated with the AI models. Therefore, the AI model can determine the various filters that are to be applied to training data for that AI model. In addition, the AI data filtering registration logic 320 can dynamically reconfigure filter(s) based on updated input parameters received from the AI models.

Figure 4:
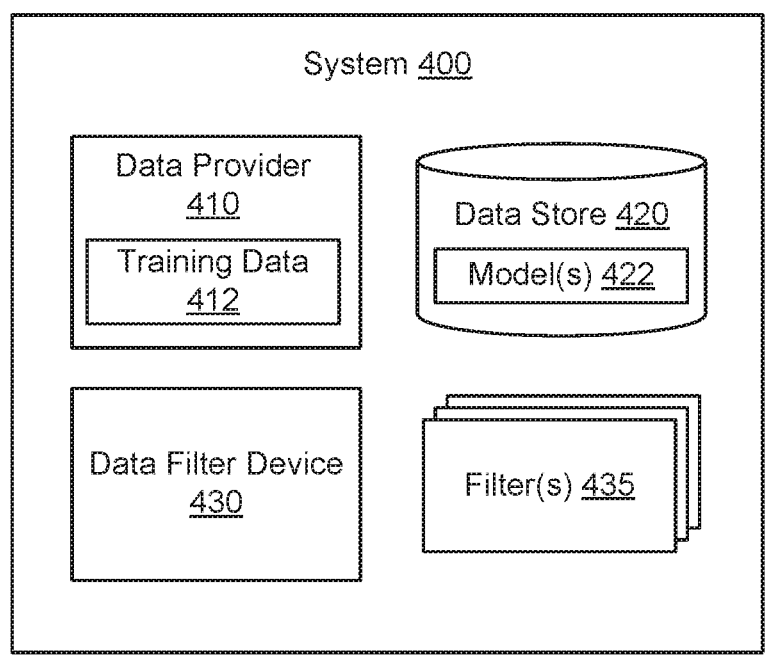
FIG. 4 illustrates a system for filtering incoming training data in accordance with an example embodiment.

FIG. 4 illustrates a system 400 for filtering training data 412. The system 400 can include a data provider 410, a data store 420 and a data filter device 430. The data provider 410 can provide the training data 412. The data store 420 can store a plurality of models 422. The data filter device 430 can receive the training data 412 from the data provider 410. The training data 412 can include metadata that indicates a model 422 from the plurality of models 422 in the data store 420 that is associated with the training data 412. The data filter device 430 can identify a filter 435 that is associated with the model 422 stored in the data store 420. The data filter device 430 can apply the filter 435 to the training data 412 received from the data provider 410 to obtain filtered training data. The data filter device 430 can provide the filtered training data to the model 422 stored in the data store 420. The filtered training data can be used to train the model 422.

Figure 5:
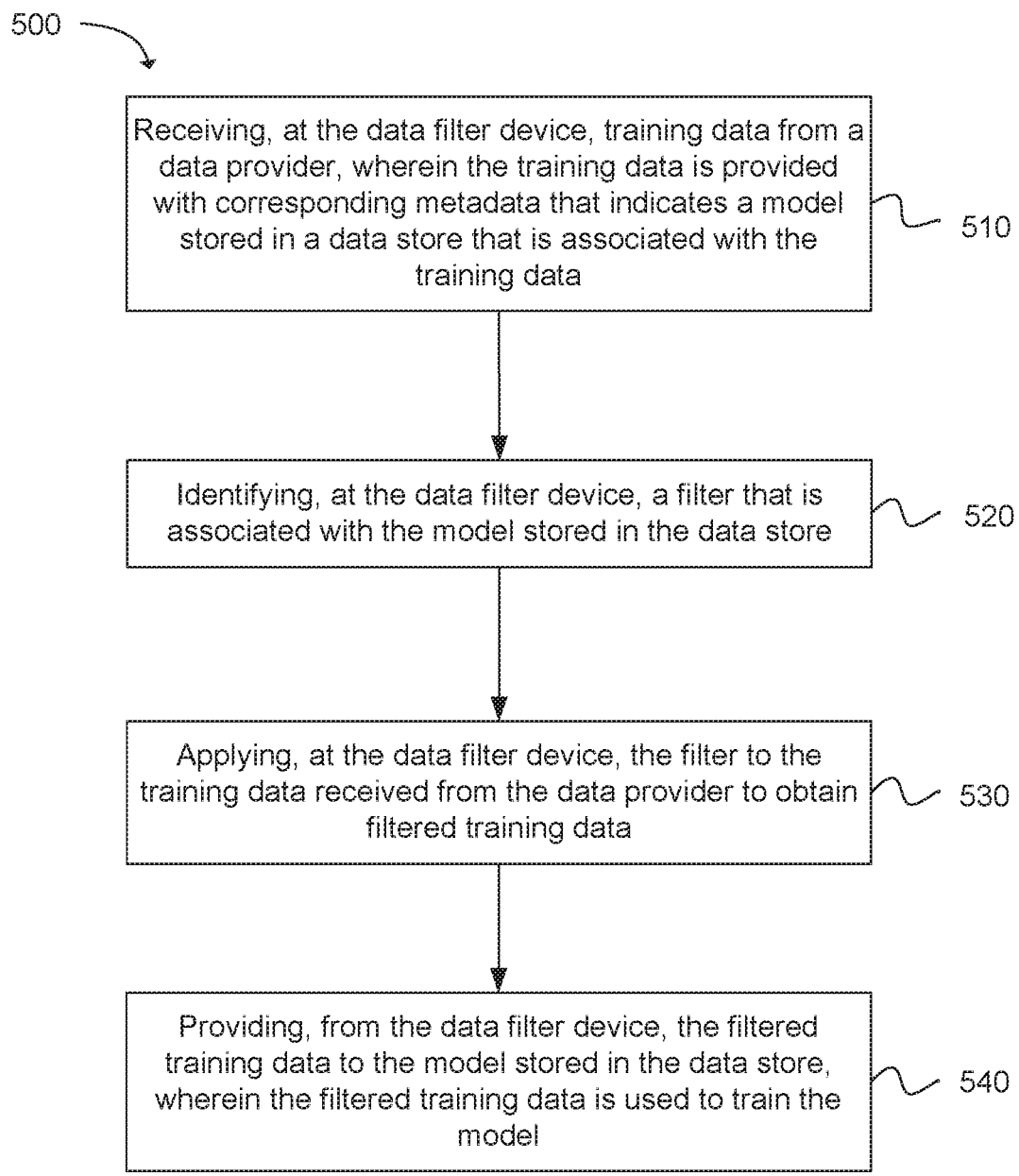
FIG. 5 is a flowchart illustrating operations for filtering training data at a data filter device in accordance with an example embodiment.

Another example provides a method 500 for filtering training data at a data filter device, as shown in the flow chart in FIG. 5. The method can be executed as instructions on a machine, where the instructions are included on at least one computer readable medium or one non-transitory machine readable storage medium. The method can include the operation of: receiving, at the data filter device, training data from a data provider, wherein the training data is provided with corresponding metadata that indicates a model stored in a data store that is associated with the training data, as in block 510. The method can include the operation of: identifying, at the data filter device, a filter that is associated with the model stored in the data store, as in block 520. The method can include the operation of: applying, at the data filter device, the filter to the training data received from the data provider to obtain filtered training data, as in block 530. The method can include the operation of: providing, from the data filter device, the filtered training data to the model stored in the data store, wherein the filtered training data is used to train the model, as in block 540.

Figure 6:
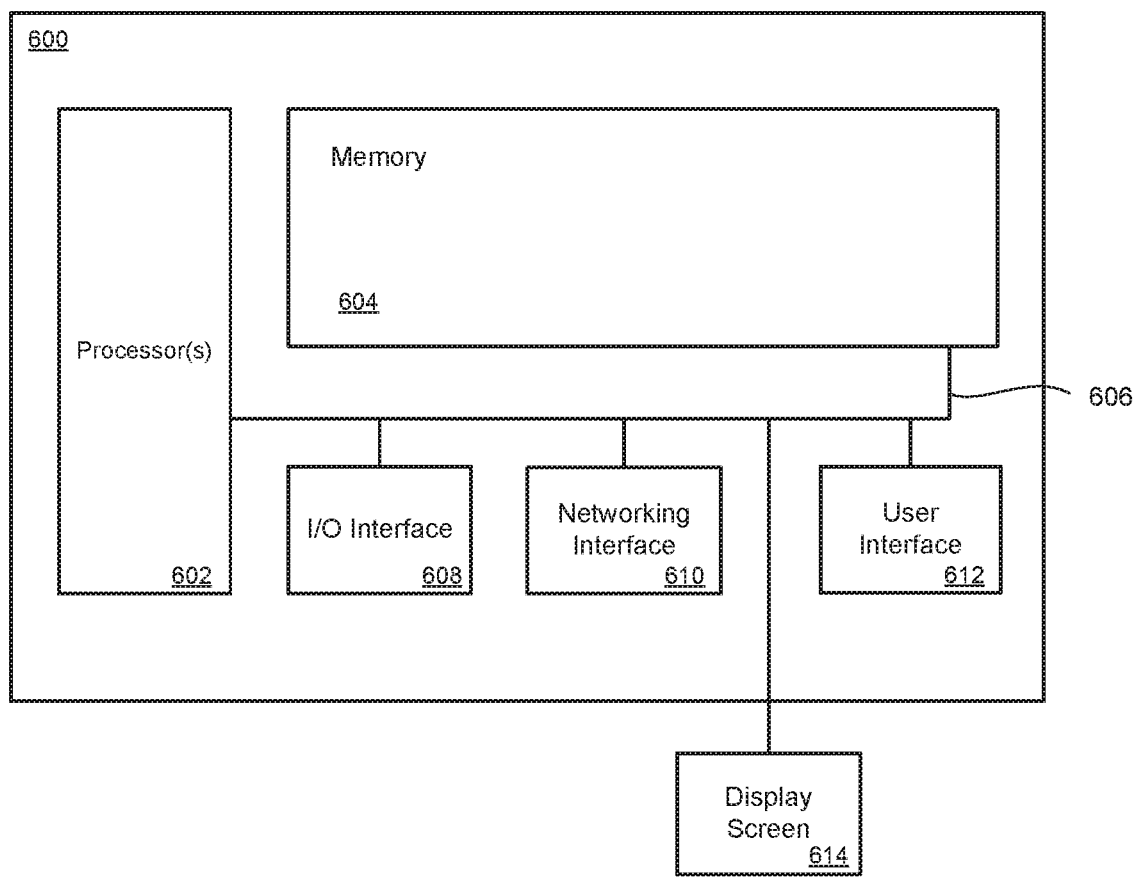
FIG. 6 illustrates a computing system that includes a data storage device in accordance with an example embodiment.

FIG. 6 illustrates a general computing system or device 600 that can be employed in the present technology. The computing system or device 600 can include a processor 602 in communication with a memory 604. The memory 604 can include any device, combination of devices, circuitry, and the like that is capable of storing, accessing, organizing, and/or retrieving data. Non-limiting examples include SANs (Storage Area Network), cloud storage networks, volatile or non-volatile RAM, phase change memory, optical media, hard-drive type media, and the like, including combinations thereof.

The computing system or device 600 additionally includes a local communication interface 606 for connectivity between the various components of the system. For example, the local communication interface 606 can be a local data bus and/or any related address or control busses as may be desired.

The computing system or device 600 can also include an I/O (input/output) interface 608 for controlling the I/O functions of the system, as well as for I/O connectivity to devices outside of the computing system or device 600. A network interface 610 can also be included for network connectivity. The network interface 610 can control network communications both within the system and outside of the system. The network interface can include a wired interface, a wireless interface, a Bluetooth interface, optical interface, and the like, including appropriate combinations thereof. Furthermore, the computing system or device 600 can additionally include a user interface 612, a display device 614, as well as various other components that would be beneficial for such a system.

The processor 602 can be a single or multiple processors, and the memory 604 can be a single or multiple memories. The local communication interface 606 can be used as a pathway to facilitate communication between any of a single processor, multiple processors, a single memory, multiple memories, the various interfaces, and the like, in any useful combination.

Various techniques, or certain aspects or portions thereof, can take the form of program code (i.e., instructions) embodied in tangible media, such as CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, data centers, and the like.

EXAMPLES

The following examples pertain to specific invention embodiments and point out specific features, elements, or steps that can be used or otherwise combined in achieving such embodiments.

In one example, there is provided a data filter device operable to filter training data. The data filter device can comprise a controller including data filtering logic configured to configured to receive, at the data filter device, training data from a data provider, wherein the training data is provided with corresponding metadata that indicates a model stored in a data store that is associated with the training data. The controller can be configured to identify, at the data filter device, a filter that is associated with the model stored in the data store. The controller can be configured to apply, at the data filter device, the filter to the training data received from the data provider to obtain filtered training data. The controller can be configured to provide, from the data filter device, the filtered training data to the model stored in the data store, wherein the filtered training data is used to train the model.

In one example of the data filter device, the model is an artificial intelligence (AI) model.

In one example of the data filter device, the data filter device maintains the filter and a set of filtering rules associated with the filter, wherein the filtering rules are stored on the data filter device as a bit stream, wherein the bit stream is configuration data loaded into the data filter device.

In one example of the data filter device, the data filter device is data filtering logic that is included in one of: a field-programmable gate array (FPGA), a configurable application-specific integrated circuit (ASIC) or a node controller.

In one example of the data filter device, the filter is configured for one or more tenants.

In one example of the data filter device, the data filter device is included in a network device, wherein the network device includes a network switch or a network gateway.

In one example of the data filter device, the data filter device is included in one of: a storage node, a storage node controller in a storage node, an input/output (I/O) controller, a computing platform, a pooled memory or another device connected to a data center.

In one example of the data filter device, the data provider is one of: a computing platform, an Internet of Things (IoT) device or a vehicle.

In one example of the data filter device, the controller is further configured to: receive input parameters from the model; register the filter that is associated with the model to include the input parameters received from the model; and store the filter that is associated with the model.

In one example of the data filter device, the controller is further configured to identify the filter from a predefined set of filters that are available to be applied to different models.

In one example of the data filter device, the controller is further configured to obtain the filtered training data in accordance with a quality of service (QoS) parameter that defines a minimum and maximum desired service level agreement (SLA) for a bandwidth allocated to the model.

In one example of the data filter device, the controller is further configured to receive the training data directly from the data provider or indirectly from the data provider via an intermediary data provider.

In one example of the data filter device, the controller is further configured to provide the filtered training data directly to the model or indirectly to the model via an intermediary data filter device.

In one example of the data filter device, the model is stored in the data store that is included in a data center, wherein the data store is included in one or more of: a storage node, a computing platform or a pooled memory.

In one example of the data filter device, the controller is further configured to discard training data that is blocked by the filter applied to the training data.

In one example of the data filter device, the controller is further configured to: receive updated input parameters from the model, wherein the updated input parameters reflect an updated objective of the model; and modify the filter that is associated with the model to incorporate the updated input parameters received from the model.

In one example of the data filter device, the controller is further configured to manage a plurality of filters for a plurality of models that are stored in a data center, wherein each model is associated with a set of filters within the plurality of filters.

In one example of the data filter device, the metadata that corresponds to the training data further indicates a data type associated with the training data and a device type associated with the data provider.

In one example, there is provided a system for filtering training data. The system can comprise a data provider operable to provide training data. The system can comprise a data store operable to store a plurality of models. The system can comprise a data filter device comprising logic. The logic can receive the training data from the data provider, wherein the training data includes metadata that indicates a model from the plurality of models in the data store that is associated with the training data. The logic can identify a filter that is associated with the model stored in the data store. The logic can apply the filter to the training data received from the data provider to obtain filtered training data. The logic can provide the filtered training data to the model stored in the data store, wherein the filtered training data is used to train the model.

In one example of the system, the model is an artificial intelligence (AI) model.

In one example of the system, the filter includes a set of filtering rules, and the filtering rules are provided to the filter as a bit stream, wherein the bit stream is configuration data loaded into one of: a field-programmable gate array (FPGA), a configurable application-specific integrated circuit (ASIC) or a node controller.

In one example of the system, the filter is configured for one or more tenants.

In one example of the system, the system further comprises a network device that includes the data filter device, wherein the network device is a network switch or a network gateway.

In one example of the system, the metadata included in the training data indicates a data type associated with the training data and a device type associated with the data provider.

In one example, there is provided a method for filtering training data at a data filter device. The method can include the operation of: receiving, at the data filter device, training data from a data provider, wherein the training data is provided with corresponding metadata that indicates a model stored in a data store that is associated with the training data. The method can include the operation of: identifying, at the data filter device, a filter that is associated with the model stored in the data store. The method can include the operation of: applying, at the data filter device, the filter to the training data received from the data provider to obtain filtered training data. The method can include the operation of: providing, from the data filter device, the filtered training data to the model stored in the data store, wherein the filtered training data is used to train the model.

In one example of the method for filtering training data at the data filter device, the method can further comprise the operations of: receiving input parameters from the model; registering the filter that is associated with the model to include the input parameters received from the model; and storing the filter that is associated with the model.

In one example of the method for filtering training data at the data filter device, the method can further comprise the operation of: identifying the filter from a predefined set of filters that are available to be applied to different models.

In one example of the method for filtering training data at the data filter device, the method can further comprise the operation of: obtaining the filtered training data in accordance with a quality of service (QoS) parameter that defines a minimum and maximum desired service level agreement (SLA) for a bandwidth allocated to the model.

In one example of the method for filtering training data at the data filter device, the method can further comprise the operation of: receiving the training data directly from the data provider or indirectly from the data provider via an intermediary data provider.

In one example of the method for filtering training data at the data filter device, the method can further comprise the operation of: providing the training data directly to the model or indirectly to the model via an intermediary data filter device.

In one example of the method for filtering training data at the data filter device, the method can further comprise the operation of: discarding training data that is blocked by the filter applied to the training data.

In one example of the method for filtering training data at the data filter device, the method can further comprise the operations of: receiving updated input parameters from the model, wherein the updated input parameters reflect an updated objective of the model; and modifying the filter that is associated with the model to incorporate the updated input parameters received from the model.

In one example of the method for filtering training data at the data filter device, the method can further comprise the operation of: managing a plurality of filters for a plurality of models that are stored in a data center, wherein each model is associated with a set of filters within the plurality of filters.

While the forgoing examples are illustrative of the principles of invention embodiments in one or more particular applications, it will be apparent to those of ordinary skill in the art that numerous modifications in form, usage and details of implementation can be made without the exercise of inventive faculty, and without departing from the principles and concepts of the disclosure.

What is claimed is:

1. A storage device, comprising:
    a controller coupled to a data store, the controller to:
        receive a stream of data for one or more artificial intelligence ("AI") models stored in the data store;
        reduce an amount of the stream of data received for the one or more AI models stored in the data store based on a storage data filter maintained by the controller, the storage data filter to define which data received in the stream of data is to be discarded versus which data received in the stream of data is to be kept and stored the data store; and
        receive an updated input parameter to the storage data filter from any of the one or more AI models, the updated input parameter incorporating any of a real-time feedback data and a history data for assessing a performance of the one or more AI models trained with stored data, the performance including any of an accuracy and efficacy of the one or more AI models over time.

2. The storage device of claim 1, wherein the controller maintains the storage data filter and a set of filtering rules associated with the storage data filter, wherein the filtering rules are stored on the storage device as a bit stream, wherein the bit stream is configuration data loaded into the storage device.

3. The storage device of claim 2, wherein the controller includes a storage data filter logic in any one or more of: a field-programmable gate array (FPGA), a configurable application-specific integrated circuit (ASIC) and a storage node controller of a storage node in which the data store is included.

4. The storage device of claim 1 comprises a network device, wherein the network device includes a network switch or a network gateway.

5. The storage device of claim 1, wherein:
    the data store in which the stream of data is to be kept and stored includes any of: an endpoint storage, a memory device, a storage node, a storage node controller in the storage node, an input/output (I/O) controller, a computing platform, a pooled memory or another device connected to a data center hosting the storage device.

6. The storage device of claim 1, wherein the controller is further to identify the storage data filter from a predefined set of storage data filters associated with any of the one or more AI models.

7. The storage device of claim 1, wherein the controller is to reduce the amount of the stream of data stored in the data store for the one or more AI models in accordance with a quality of service (QoS) parameter that defines a minimum and maximum desired service level agreement (SLA) for a bandwidth allocated to the one or more AI models.

8. The storage device of claim 1, wherein to receive the updated input parameter to the storage data filter the controller is further to
    register the storage data filter associated with any of the one or more AI model models to incorporate the updated input parameter received from any of the one or more AI models trained with the stored data; and
    store the storage data filter associated with any of the one or more AI models trained with the stored data.

9. The storage device of claim 1, wherein:
    the controller is further to manage a plurality of data storage filters for the one or more AI models stored in the data store; and
    each of the one or more AI models is associated with a set of data storage filters within the plurality of data storage filters.

10. The storage device of claim 1, wherein the stream of data for the one or more AI models includes metadata that indicates a data type associated with the stream of data and a device type associated with a provider of the stream of data, the device type including a type of vehicle and the data type including a type of data associated with the type of vehicle.

11. A storage system comprising:
a data provider operable to provide a stream of data;
a data store operable to store a plurality of artificial intelligence ("AI") models; and
a circuitry to perform a storage data filter logic to:
reduce an amount of the stream of data received for the one or more of the AI models stored in the data store based on a storage data filter, the storage data filter to define which data received in the stream of data is to be discarded versus which data received in the stream of data is to be kept and stored in the data store, and
receive an updated input parameter to the storage data filter from any of the one or more AI models, the updated input parameter incorporating any of a real-time feedback data and a history data for assessing a performance of the one or more AI models trained with stored data, the performance including any of an accuracy and efficacy of the one or more AI models over time.

12. The storage system of claim 11, wherein the storage data filter includes a set of filtering rules, and the filtering rules are stored as a bit stream, wherein the bit stream is configuration data loaded into any one or more of: a field-programmable gate array (FPGA), a configurable application-specific integrated circuit (ASIC) and a storage node controller of a storage node in which the data store is included.

13. The storage system of claim 11, further comprising:
a network device that includes the circuitry to perform the storage data filter logic, wherein the network device is any one or more of a network switch and a network gateway of a storage area network that includes the data store in which the stream of data is to be kept and stored.

14. The storage system of claim 11, wherein the stream of data for the one or more AI models includes metadata that indicates a data type associated with the stream of data and a device type associated with a provider of the stream of data, the device type including a type of vehicle and the data type including a type of data associated with the type of vehicle.

15. A method comprising:
receiving, at a storage device, a stream of data for one or more artificial intelligence ("AI") models stored in a data store of the storage device;
reducing an amount of the stream of data received for the one or more AI models stored in the data store based on a storage data filter, the storage data filter defining which data received in the stream of data is to be discarded versus which data in the stream of data is to be kept and stored in the data store; and
receiving an updated input parameter to the storage data filter from any of the one or more AI models, the update incorporating any of a real-time feedback data and a history data for assessing a performance of the one or more AI models trained with stored data, the performance including any of an accuracy and efficacy of the one or more AI models over time.

16. The method of claim 15, further comprising identifying the storage data filter from a predefined set of storage data filters associated with any of the one or more AI models.

17. The method of claim 15, wherein reducing the amount of the stream of data stored in the data store for the one or more AI models is performed in accordance with a quality of service (QoS) parameter that defines a minimum and maximum desired service level agreement (SLA) for a bandwidth allocated to the one or more AI models.

18. The method of claim 15, wherein receiving the updated input parameter to the storage data filter from any of the one or more AI models further comprises
registering the storage data filter associated with any of the one or more AI models to incorporate the updated input parameter; and
storing the storage data filter associated with any of the one or more AI models trained with the stored data.

19. The method of claim 15, wherein:
reducing the amount of the stream of data received for the one or more AI models stored in the data store is based on one or more of a plurality of storage data filters; and
each of the one or more AI models is associated with a set of data storage filters within the plurality of data storage filters.

* * * * *